(12) United States Patent
Surace

(10) Patent No.: US 10,711,616 B2
(45) Date of Patent: Jul. 14, 2020

(54) AIRFOIL HAVING ENDWALL PANELS

(71) Applicant: United Technologies Corporation, Farmington, CT (US)

(72) Inventor: Raymond Surace, Newington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 687 days.

(21) Appl. No.: 15/353,885

(22) Filed: Nov. 17, 2016

(65) Prior Publication Data
US 2018/0135418 A1    May 17, 2018

(51) Int. Cl.
| | |
|---|---|
| F01D 5/14 | (2006.01) |
| F01D 25/12 | (2006.01) |
| F01D 25/00 | (2006.01) |
| F01D 9/04 | (2006.01) |
| F02C 7/12 | (2006.01) |
| F01D 5/28 | (2006.01) |

(Continued)

(52) U.S. Cl.
CPC ............ *F01D 5/147* (2013.01); *F01D 5/187* (2013.01); *F01D 5/282* (2013.01); *F01D 5/284* (2013.01); *F01D 9/041* (2013.01); *F01D 9/042* (2013.01); *F01D 25/005* (2013.01); *F01D 25/12* (2013.01); *F02C 7/12* (2013.01); *F04D 29/542* (2013.01); *F05D 2220/32* (2013.01); *F05D 2240/12* (2013.01); *F05D 2240/30* (2013.01); *F05D 2240/81* (2013.01); *F05D 2260/22141* (2013.01); *F05D 2260/36* (2013.01); *F05D 2300/17* (2013.01); *F05D 2300/20* (2013.01); *F05D 2300/603* (2013.01); *F05D 2300/6033* (2013.01); *Y02T 50/672* (2013.01); *Y02T 50/676* (2013.01)

(58) Field of Classification Search
CPC .......... F01D 5/147; F01D 5/143; F01D 9/041; F01D 9/042; F01D 9/044; F01D 5/282; F01D 5/284; Y02T 50/672; F05D 2300/603; F05D 2300/6033; F05D 2260/36; F05D 2240/12; F04D 29/542; F04D 29/544
USPC ................................................. 415/138–139
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |

(Continued)

FOREIGN PATENT DOCUMENTS

| | | |
|---|---|---|
| EP | 0764764 | 3/1997 |
| EP | 1764481 | 3/2007 |

(Continued)

OTHER PUBLICATIONS

European Search Report for European Patent Application No. 17202435.8 completed Mar. 26, 2018.

(Continued)

*Primary Examiner* — Christopher Verdier
(74) *Attorney, Agent, or Firm* — Carlson, Gaskey & Olds, P.C.

(57) ABSTRACT

An airfoil includes a core structure that has an airfoil portion that defines at least a portion of an airfoil profile. The airfoil portion has first and second opposed ends. A support wall extends from the first end. An endwall panel is attached to the support wall adjacent the airfoil portion.

18 Claims, 3 Drawing Sheets

(51) Int. Cl.
*F01D 5/18* (2006.01)
*F04D 29/54* (2006.01)

(56) References Cited

U.S. PATENT DOCUMENTS

| | | | |
|---|---|---|---|
| 4,247,259 A | 1/1981 | Saboe et al. | |
| 4,396,349 A | 8/1983 | Hueber | |
| 4,786,234 A | 11/1988 | Readnour | |
| 4,914,794 A | 4/1990 | Strangman | |
| 5,358,379 A | 10/1994 | Pepperman et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,425,738 B1 * | 7/2002 | Shaw | F01D 9/041 |
| | | | 415/208.1 |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 6,910,854 B2 * | 6/2005 | Joslin | F01D 5/225 |
| | | | 415/139 |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,399,159 B2 * | 7/2008 | Matheny | F01D 5/147 |
| | | | 416/62 |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 10,273,818 B2 * | 4/2019 | Vetters | F01D 25/005 |
| 2008/0159850 A1 | 7/2008 | Tholen et al. | |
| 2010/0054932 A1 | 3/2010 | Schiavo | |
| 2010/0136258 A1 | 6/2010 | Strock et al. | |
| 2013/0004331 A1 | 1/2013 | Beeck | |
| 2013/0251536 A1 * | 9/2013 | Mironets | F01D 5/147 |
| | | | 416/229 A |
| 2016/0090851 A1 | 3/2016 | Carr et al. | |
| 2016/0130957 A1 * | 5/2016 | Freeman | F01D 5/3061 |
| | | | 416/193 R |

FOREIGN PATENT DOCUMENTS

| | | |
|---|---|---|
| EP | 2105579 | 9/2009 |
| EP | 2853688 | 4/2015 |
| GB | 2272453 | 5/1994 |
| JP | 61066802 | 4/1986 |
| JP | 05321602 | 12/1993 |
| JP | 2007255224 | 10/2007 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

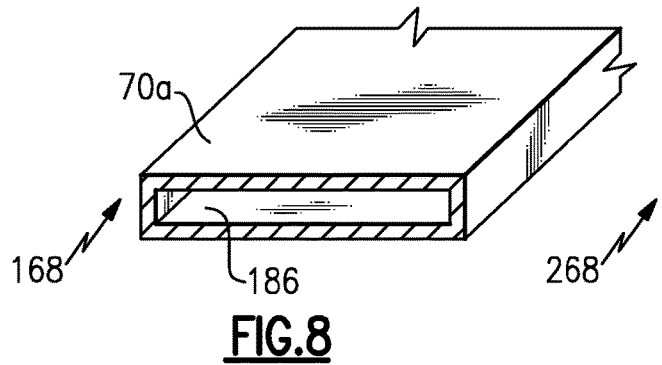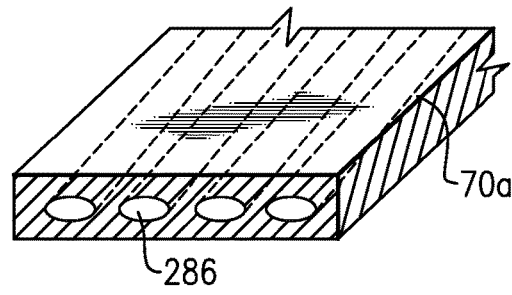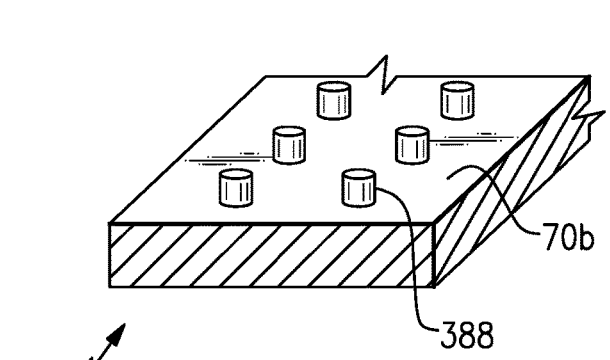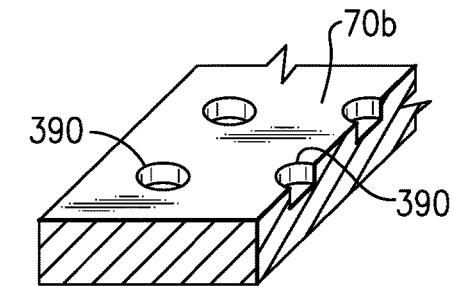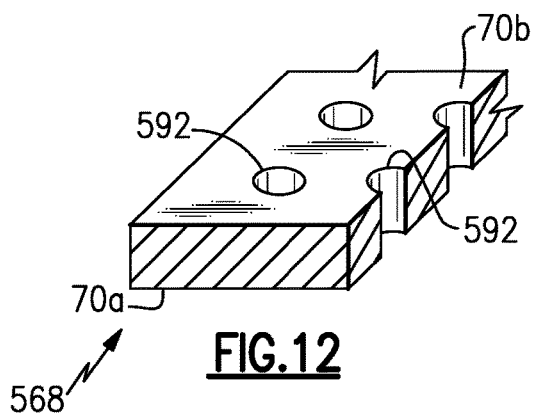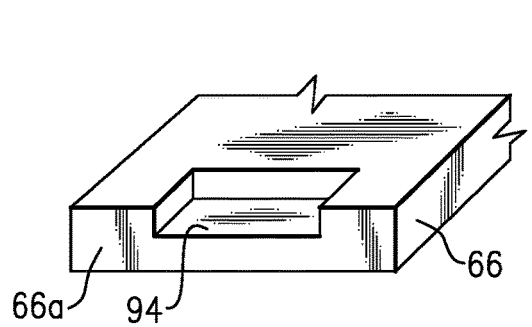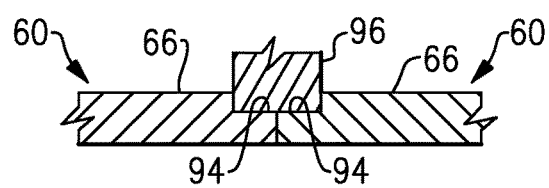

AIRFOIL HAVING ENDWALL PANELS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes a core structure that has an airfoil portion that defines at least a portion of an airfoil profile. The airfoil portion has first and second opposed ends, and a support wall that extends from the first end. An endwall panel is attached to the support wall adjacent the airfoil portion.

In a further embodiment of any of the foregoing embodiments, the core structure is formed of a metal.

In a further embodiment of any of the foregoing embodiments, the metal is selected from the group consisting of cobalt alloys and nickel alloys coated with cobalt or cobalt alloy.

In a further embodiment of any of the foregoing embodiments, the endwall panel is formed of a ceramic.

In a further embodiment of any of the foregoing embodiments, the support wall includes a first connector and the endwall panel includes a second connector that is interlocked with the first connector at a joint that secures the endwall panel to the support wall.

In a further embodiment of any of the foregoing embodiments, one of the first connector and the second connector includes a dovetail and the other of the first connector and the second connector includes a doveslot.

In a further embodiment of any of the foregoing embodiments, the endwall panel is slidingly attached to the support wall.

In a further embodiment of any of the foregoing embodiments, the endwall panel includes a fillet proximate the airfoil portion of the core structure.

In a further embodiment of any of the foregoing embodiments, the endwall panel includes a first, gas path side and a second, opposed side, and the second, opposed side includes at least one of a protrusion or a recess.

In a further embodiment of any of the foregoing embodiments, the endwall panel is hollow.

In a further embodiment of any of the foregoing embodiments, the endwall panel includes at least one through-hole.

In a further embodiment of any of the foregoing embodiments, the endwall panel includes internal channels.

In a further embodiment of any of the foregoing embodiments, the endwall panel includes protruded or recessed heat transfer augmentation features.

A further embodiment of any of the foregoing embodiments includes a second endwall panel attached to the support wall and abutting the endwall panel.

In a further embodiment of any of the foregoing embodiments, the second endwall panel abuts the endwall panel in a shiplap joint.

A further embodiment of any of the foregoing embodiments includes an airfoil section removably attached with the core structure. The airfoil section defines a portion of the airfoil profile. The airfoil section defines a leading end of the airfoil profile.

A gas turbine engine according to an example of the present disclosure includes a compressor section, a combustor in fluid communication with the compressor section, and a turbine section in fluid communication with the combustor. One of the turbine section or the compressor section has an airfoil that has a core structure that includes an airfoil portion which defines at least a portion of an airfoil profile. The airfoil portion has first and second opposed ends, and a support wall extends from the first end. An endwall panel is attached to the support wall adjacent the airfoil portion.

In a further embodiment of any of the foregoing embodiments, the core structure is formed of a metal and the endwall panel is formed of a monolithic ceramic or a ceramic matrix composite.

In a further embodiment of any of the foregoing embodiments, the support wall includes a first connector and the endwall panel includes a second connector that is interlocked with the first connector at a joint that secures the endwall panel to the support wall.

In a further embodiment of any of the foregoing embodiments, one of the first connector and the second connector includes a dovetail and the other of the first connector and the second connector includes a doveslot.

A method of assembling an airfoil according to an example of the present disclosure includes attaching an endwall panel to a core structure to form a core gas path endwall boundary. The core structure includes an airfoil portion that defines at least a portion of an airfoil profile. The airfoil portion has first and second opposed ends, and a support wall that extends from the first end. The endwall panel is attached to the support wall adjacent the airfoil portion.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 8 illustrates an example endwall panel that is hollow.

FIG. 9 illustrates an example endwall panel that has a plurality of internal channels.

FIG. 10 illustrates an example endwall panel that has one or more protrusions.

FIG. 11 illustrates an example endwall panel that has one or more recesses.

FIG. 12 illustrates another example endwall panel that has one or more through-holes.

FIG. 13 illustrates an example of a keyway for limiting circumferential movement of an airfoil.

FIG. 14 illustrates a sectioned view of a key engaged in a keyway.

DETAILED DESCRIPTION

Figure 1:
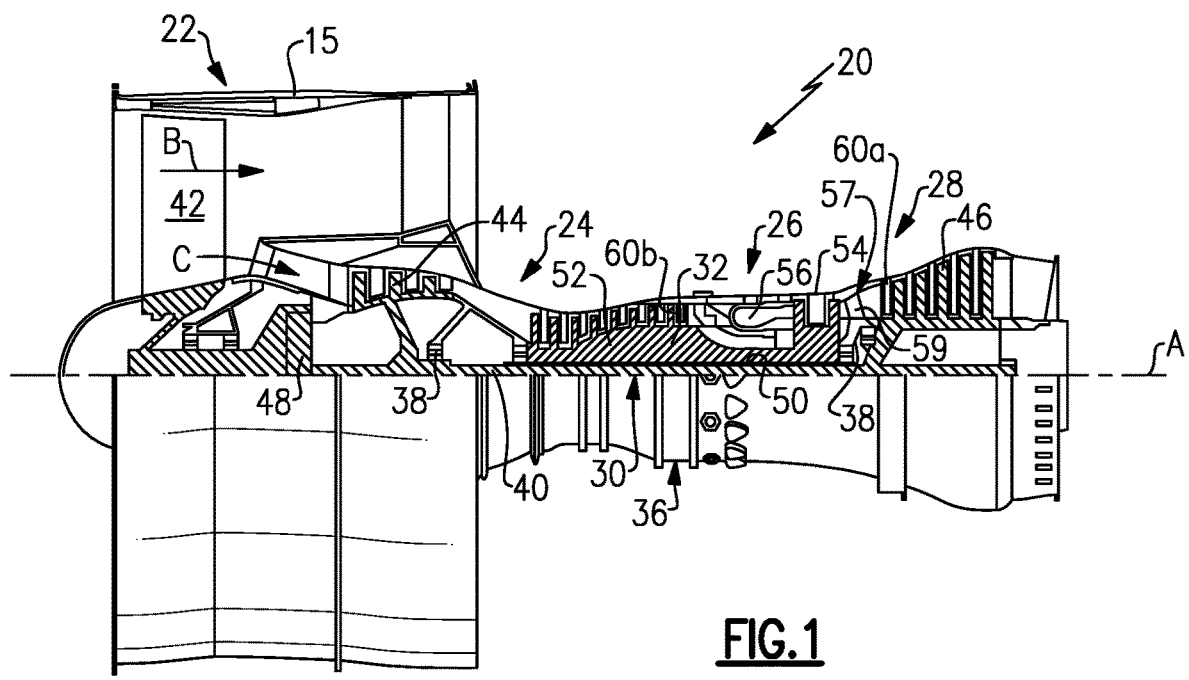
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2:
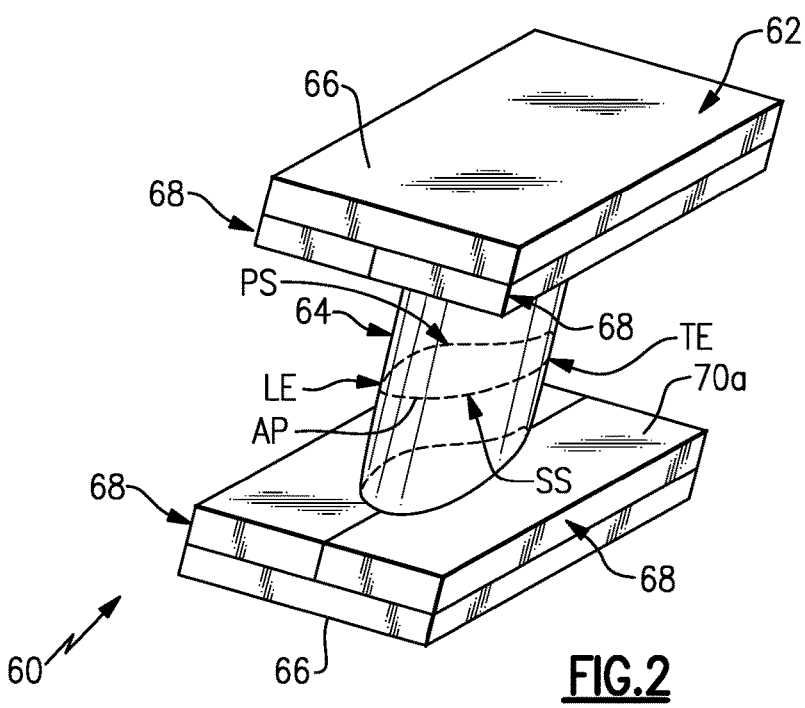
FIG. 2 illustrates an example airfoil of the engine of FIG. 1.

FIG. 2 illustrates one such component, namely an airfoil 60. For instance, the airfoil 60 can be a turbine vane, as represented at 60a in FIG. 1, or a compressor vane, as represented at 60b in FIG. 1. As will be appreciated, although the examples herein are described in the context of a vane, this disclosure is not limited to vanes, and the examples may also be applicable to blades or other airfoils that are exposed at high temperatures.

The airfoil 60 is composed of a core structure 62. The core structure 62 includes an airfoil portion 64 that defines at least a portion of an airfoil profile (AP) and at least one support wall 66. The airfoil profile AP generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane.

Figure 3:
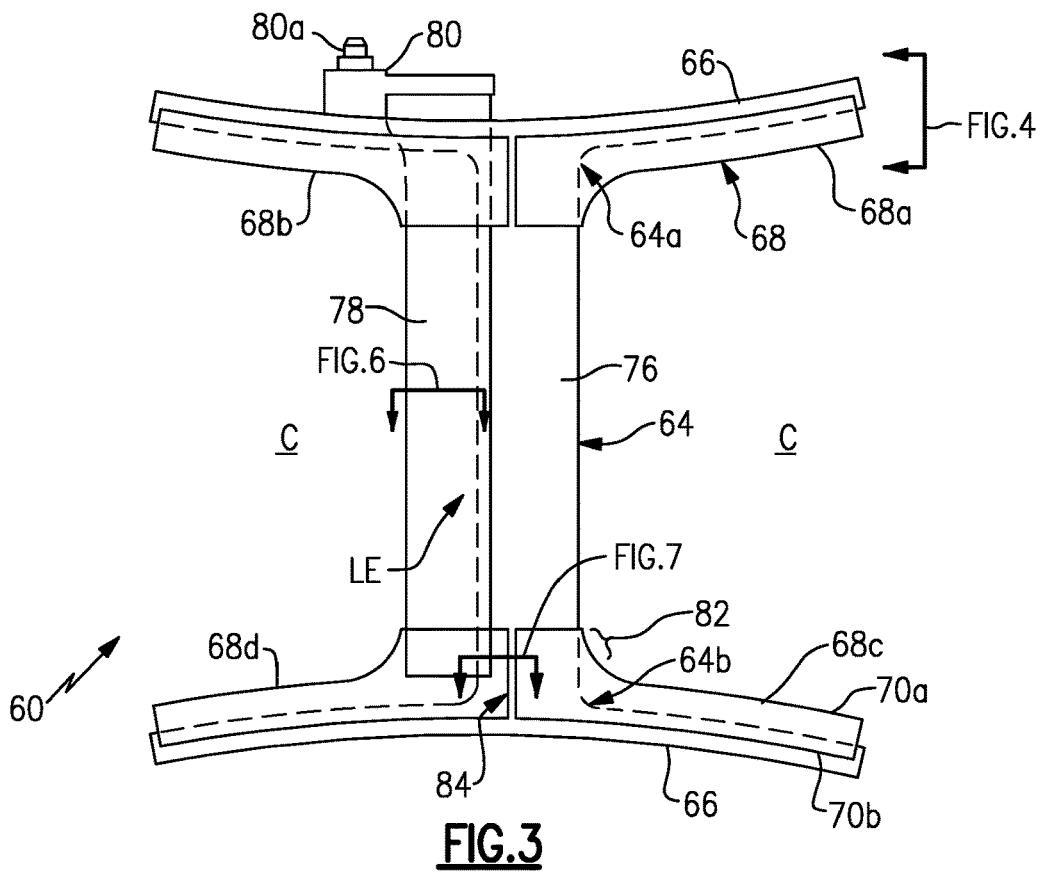
FIG. 3 illustrates an axial view of an airfoil.

Referring also to FIG. 3, which shows an axial view (forward looking aft), the airfoil portion 64 includes first and second opposed ends 64a/64b. The support wall 66 extends from the first end 64a. In this example, a support wall 66 also extends from the second end 64b. In the view shown, the support walls 66 extend in the tangential direction, which is also known as the circumferential direction.

An endwall panel 68 is attached to the support wall 66 adjacent the airfoil portion 64. In this example, the airfoil 60 includes four such endwall panels 68, which are individually designated 68a, 68b, 68c, and 68d. Each endwall panel 68 generally includes a first, gas path surface 70a and a second, opposed surface 70b. Thus, in the example shown, the endwall panels 68a/68b and their respective gas path surfaces 70a form a radially inner endwall boundary of the core gas path. Likewise, the endwall panels 68c/68d and their respective gas path surfaces 70a form a radially outer endwall boundary of the core gas path.

The use of the core structure 62 and the endwall panels 68 permits different materials to be used in different locations for different purposes in the airfoil 60. For example, the endwall panels 68 can be formed of a high temperature resistant material, while the core structure 62 can be made of a strong and durable material. In one example, the core structure 62 is formed of a metal, and the endwall panels 68 are formed of a ceramic. A ceramic is a compound of metallic or metalloid elements bonded with non-metallic elements or metalloid elements primarily in ionic or covalent bonds. Example ceramics made include, but are not limited to, oxides, carbides, nitrides, borides, silicides, and combinations thereof. In further examples, one or more of the endwall panels 68 are formed of a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

The core structure 62 may be formed of a ceramic or of a metal. Metal alloys provide a good combination of strength and durability. Example alloys may include, but are not limited to, nickel alloys, cobalt alloys, or combinations thereof. In examples in which the core structure 62 is in contact with a ceramic, such as a ceramic of the endwall panels 68, compatible materials may be selected for the core structure 62. For instance, nickel alloys are reactive with certain ceramics. In this regard, the core structure 62 may include cobalt, which is substantially non-reactive with ceramic. The core structure 62 may be formed of cobalt or a cobalt alloy, or alternatively formed of a nickel alloy that is coated with cobalt or cobalt alloy.

Figures 4, 5:
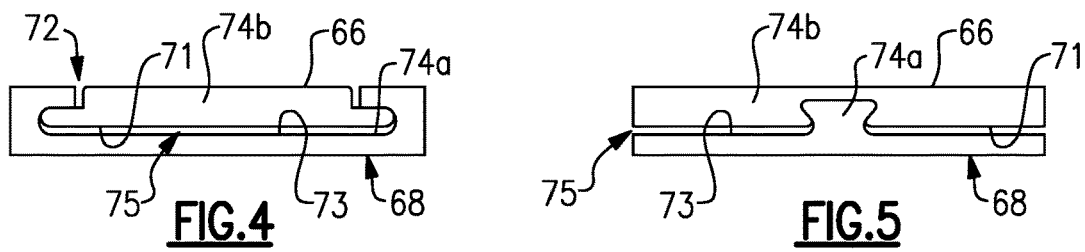
FIG. 4 illustrates a view of a joint between a support wall and an endwall panel.
FIG. 5 illustrates another example joint between a support wall and an endwall panel.

As shown in the view of FIG. 4, the endwall panel 68 is attached to the support wall 66 in a joint 72. In this example, the endwall panel 68 includes a first connector 74a and the support wall 66 includes a second connector 74b that is interlocked with the first connector 74a in the joint 72. The interlocking between the connectors 74a/74b secures the endwall panel 68 to the support wall 66. The connectors 74a/74b can have any interlocking geometry. In this example, the first connector 74a is a doveslot and the second connector 74b is a dovetail. The interlocking between the doveslot 74a and the dovetail 74b forms a gap 75. As shown, the gap 75 is defined between a radial face 71 of the dovetail 74b and a floor 73 of the doveslot.

Alternatively, as shown in FIG. 5, the first connector 74a can be a dovetail and the second connector 74b is a doveslot. Notably, as shown, the gap 75 is formed via interlocking of the dovetail 74a and the doveslot 74b, the gap 75 defined between the radial face 71 of the doveslot 74b and the floor 73 of the dovetail 74a. As will be appreciated from the examples in FIGS. 4 and 5, the endwall panel 68 is slidably attached with the support wall 66. For instance, in a circumferential configuration, the endwall panel 68 can be slid into interlocking engagement with the support wall 66 from a circumferential or tangential direction. Likewise, each of the individual panels can be assembled onto the respective support walls 66 in a similar manner. In one alternative, rather than sliding circumferentially, the support walls 66 and endwall panels 68 are instead configured for axial assembly. In this regard, should one of the core structure 62 or endwall panels 68 require replacement, the airfoil 60 can be disassembled, the core structure 62 or endwall panel 68 can be replaced with a new one, and the airfoil 160 can be reassembled. Accordingly, the core structure 62 and endwall panels 68 can be produced individually as new parts for an original airfoil or as replacement parts in an existing airfoil.

The airfoil portion 64 of the core structure 62 may be formed of one or more airfoil sections. In this example, the airfoil portion 64 includes a first section 76 and a second section 78. For instance, the first section 76 forms a pressure side, a suction side, and a trailing end of the airfoil profile, while the second section 78 forms a leading end (LE) of the airfoil profile. In this regard, the sections 76/78 can also be formed of different materials. In one example, the first section 76 is formed of a metal, as described above, and may be integrally formed with the support walls 66 by casting or additive manufacturing. The second section 78 may be formed of a ceramic, as discussed above. In this regard, the second section 78 may be a distinct, separate piece from the core structure 62 and airfoil portion 64. The second section 78 may be removably attached with the core structure 62 via insertion into the core structure 62. For instance, the second section 78 is inserted through an opening in the support wall 66 and is held in place using a retainer 80, which may include a fastener 80a to secure the second section 78 in place. The second section can be removed by removing the retainer 80 and sliding the second section out from the core structure 62.

Figures 6, 7:
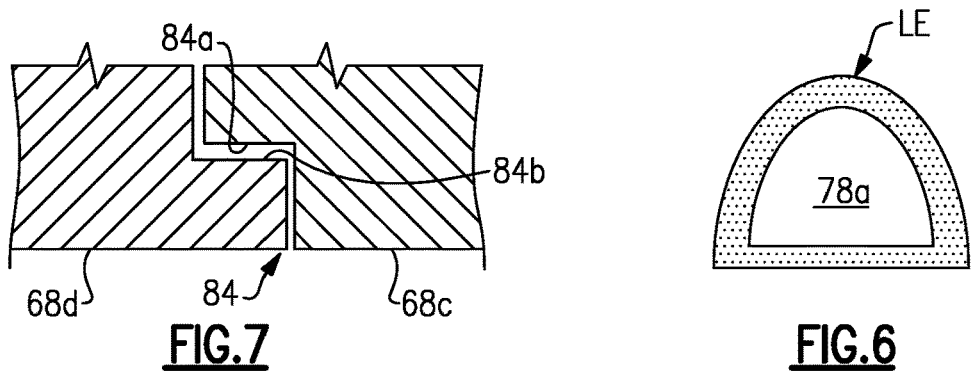
FIG. 6 illustrates a sectioned view of an airfoil section of the airfoil of FIG. 3.
FIG. 7 illustrates an example shiplap joint.

As shown in the sectioned view in FIG. 6, the second section 78 may be hollow and may include an internal passage 78a for conveying cooling bleed flow. In this regard, the second section 78 has a relatively simple cross-section that can be extruded.

Referring again to FIG. 3, the endwall panel 68 may include a fillet 82 proximate the airfoil portion 64. The fillet 82 provides a smooth transition from the surface of the endwall panel 68 to the surface of the airfoil portion 64.

Opposed ones of the endwall panels 68 may also include features for engaging each other. For instance, each pair of endwall panels 68a/68b and 68c/68d may abut in a shiplap joint 84, which is also shown in a sectioned view in FIG. 7. Each of the endwall panels 68c and 68d includes a respective shoulder 84a/84b. The shoulders 84a/84b overlap each other and thus provide a seal.

Each of the endwall panels 68 may also include one or more cooling features. FIG. 8 illustrates a representative portion of an endwall panel 168 that has one such cooling feature. In this disclosure, like reference numerals designate like elements where appropriate and reference numerals with the addition of one-hundred or multiples thereof designate modified elements that are understood to incorporate the same features and benefits of the corresponding elements. In this example, the endwall panel 168 is hollow and includes an internal passage 186. The internal passage 186 may be used to convey cooling bleed flow through the endwall panel 168, and the bleed flow may be emitted or discharged to cool the airfoil portion 64 or gas path surface 70a of the endwall panel 168.

FIG. 9 shows another example endwall panel 268. In this example, the endwall panel 268 also includes a plurality of internal channels 286, which may be used to convey cooling bleed flow through the endwall panel 268.

The endwall panels may also include surface features for enhancing cooling. For example, the endwall panel 368 illustrated in FIG. 10 includes one or more protrusions 388 on the second surface 70b of the endwall panel 368. For instance, cooling bleed air may be discharged over the second surface 70b, and the protrusions 388 may facilitate guiding and/or mixing the cooling bleed air for enhanced thermal effect and/or provide additional surface area to augment heat transfer. In this example, the protrusions 388 are circular columnar. However, the protrusions could additionally or alternatively be ovular columnar, rectangular columnar, other columnar shape, or tear-drop shaped, and the protrusions may also be sloped relative to the surface 70b.

Similarly, in FIG. 11, rather than the protrusions 388, the endwall panel 468 includes one or more recesses 390. Like the protrusions 388, the recesses 390 may also facilitate guiding and/or mixing of cooling bleed air. In this example, the recesses 390 are circular. However, the recesses 390 could additionally or alternatively be ovular, rectangular, or other shapes, and the recesses 390 may be sloped relative to the surface 70b.

FIG. 12 illustrates another example endwall panel 568. In this example, the endwall panel 568 includes one or more through-holes 592 that extend from the second surface 70b to the gas path surface 70a. Thus, cooling air flow may be provided to the second surface 70b to flow through the holes 592 to the gas path surface 70a at which the cooling bleed air may provide a film for cooling the gas path surface 70a. In this example, the holes 592 are circular. However, the holes 592 could additionally or alternatively be ovular, rectangular, or other shapes, and the holes 592 may be angled, singular or compound, relative to the surfaces 70a/70b.

A plurality of the airfoils 60 may be provided in a ring structure to form a vane pack in the engine 20. For instance, each airfoil 60 is assembled, as shown in FIG. 3, and is then assembled into the vane pack ring structure. In each of the airfoils 60 in the ring, the endwall panels 68 may be retained circumferentially by the next adjacent airfoil 60. That is, the airfoils 60 on each circumferential side of an airfoil 60 retain the endwall panels 68. If further retention is required, a key joint may be provided between adjacent airfoils 60. For instance, as shown in FIG. 13, one or more of the support walls 66 may include a keyway 94 at a circumferential edge 66a of the support walls 66. As shown in FIG. 14, when two adjacent airfoils 60 are brought into engagement circumferentially, the keyways 94 align and a key 96 can be inserted into the keyways 94 as a stop to limit or prevent circumferential movement of each of the airfoils 60. The key 96 may be supported on a static surrounding structure, such as a casing. As will be appreciated, keys 96 could alternatively be provided on support walls 66 and keyways 94 could alternatively be provided on the surrounding structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
a core structure including
an airfoil portion defining at least a portion of an airfoil profile, the airfoil portion having first and second opposed ends, and
a support wall formed of a metal and extending from the first end;
an endwall panel formed of a ceramic and attached to the support wall adjacent the airfoil portion, the support wall including a first connector and the endwall panel including a second connector that is interlocked with the first connector at a joint that secures the endwall panel to the support wall, one of the first connector and the second connector including a dovetail and the other of the first connector and the second connector including a doveslot, the joint including a gap between the dovetail and the doveslot; and
a second endwall panel attached to the support wall and abutting the endwall panel.

2. The airfoil as recited in claim 1, wherein the metal is selected from cobalt, a cobalt alloy, and a nickel alloy that is coated with cobalt or cobalt alloy.

3. The airfoil as recited in claim 1, wherein the support wall includes the dovetail and the endwall panel includes the doveslot.

4. The airfoil as recited in claim 1, wherein the endwall panel is slidingly attached to the support wall.

5. The airfoil as recited in claim 1, wherein the endwall panel includes a fillet proximate the airfoil portion of the core structure.

6. The airfoil as recited in claim 1, wherein the endwall panel includes a first, gas path side and a second, opposed side, and the second, opposed side includes at least one of a protrusion or a recess.

7. The airfoil as recited in claim 1, wherein the endwall panel is hollow.

8. The airfoil as recited in claim 1, wherein the endwall panel includes at least one through-hole.

9. The airfoil as recited in claim 1, wherein the endwall panel includes internal channels.

10. The airfoil as recited in claim 1, wherein the endwall panel includes protruded or recessed heat transfer augmentation features.

11. The airfoil as recited in claim 1, wherein the second endwall panel abuts the endwall panel in a shiplap joint.

12. The airfoil as recited in claim 1, further comprising an airfoil section removably attached with the core structure, the airfoil section defining a portion of the airfoil profile, wherein the airfoil section defines a leading end of the airfoil profile.

13. The airfoil as recited in claim 1, wherein the core structure is removably attached to the airfoil portion.

14. The airfoil as recited in claim 1, wherein the airfoil portion includes an airfoil section that is removably attached with the core structure.

15. The airfoil as recited in claim 1, wherein the gap is defined between a radial face of the dovetail and a floor of the doveslot.

16. A gas turbine engine comprising:
a compressor section;
a combustor in fluid communication with the compressor section; and
a turbine section in fluid communication with the combustor,
at least one of the turbine section or the compressor section including an airfoil having a core structure including
an airfoil portion defining at least a portion of an airfoil profile, the airfoil portion having first and second opposed ends, and
a support wall formed of a metal and extending from the first end;
an endwall panel formed of a ceramic and attached to the support wall adjacent the airfoil portion, and the support wall including a first connector and the endwall panel including a second connector that is interlocked with the first connector at a joint that secures the endwall panel to the support wall, one of the first connector and the second connector including a dovetail and the other of the first connector and the second connector including a doveslot, the joint including a gap between the dovetail and the doveslot; and
a second endwall panel attached to the support wall and abutting the endwall panel.

17. The gas turbine engine as recited in claim 16, wherein the ceramic is a monolithic ceramic or a ceramic matrix composite.

18. The gas turbine as recited in claim 16, wherein the endwall panel includes a fillet proximate the airfoil portion of the core structure and the fillet provides a smooth transition from the endwall panel to the airfoil portion.

* * * * *